Oct. 1, 1946.  P. A. HOWARD  2,408,517

PIPE CUTTING APPARATUS

Filed Sept. 4, 1943  2 Sheets-Sheet 1

INVENTOR:
Posy A. Howard.
BY
ATTORNEYS.

Oct. 1, 1946.　　　P. A. HOWARD　　　2,408,517
PIPE CUTTING APPARATUS
Filed Sept. 4, 1943　　　2 Sheets-Sheet 2
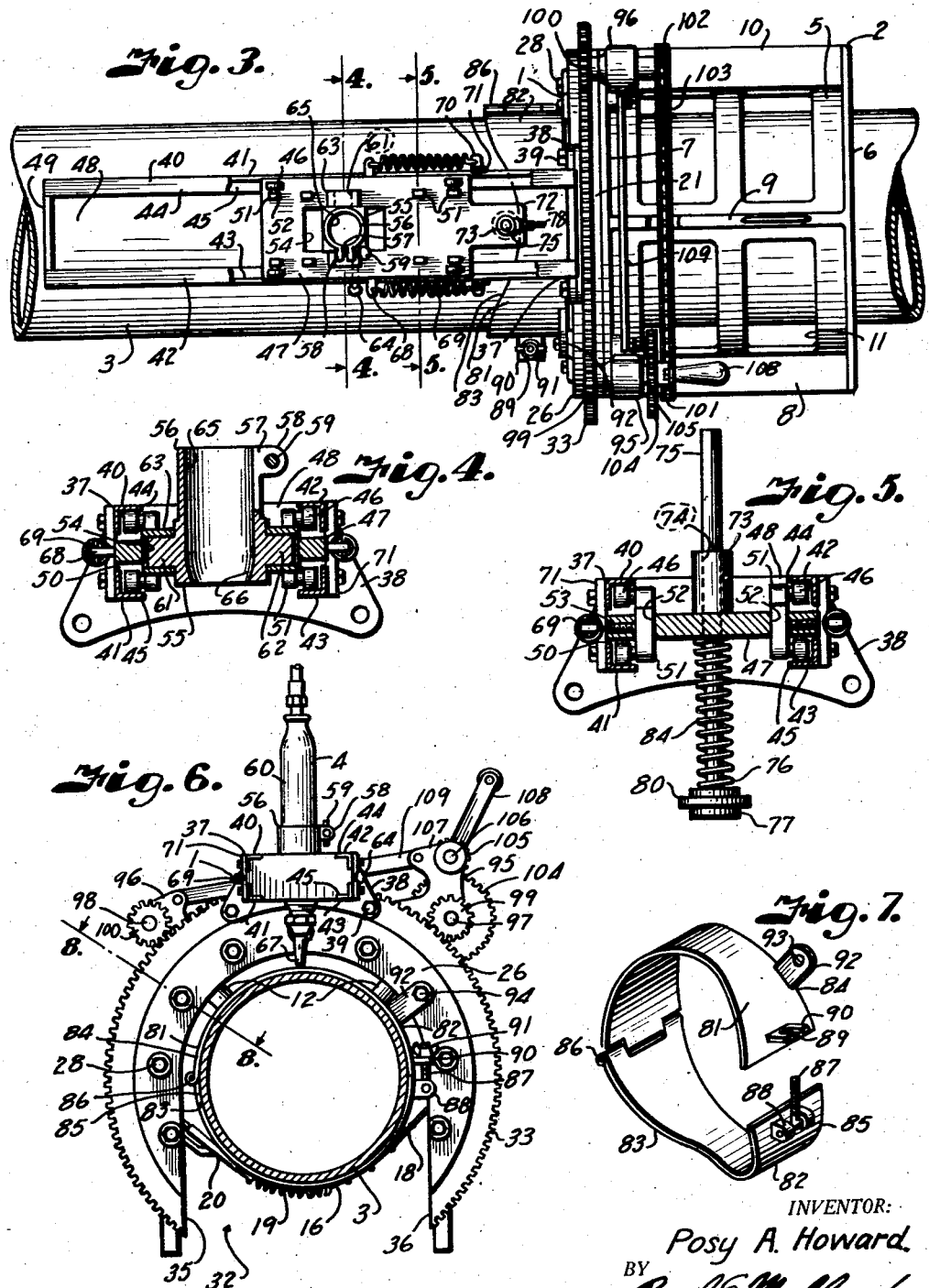
INVENTOR:
Posy A. Howard
BY
Paul E. Mullendore
ATTORNEYS.

Patented Oct. 1, 1946

2,408,517

UNITED STATES PATENT OFFICE 2,408,517

PIPE-CUTTING APPARATUS

Posy A. Howard, Tulsa, Okla., assignor of one-half to C. A. Mathey and one-half to C. B. Harter, Tulsa, Okla.

Application September 4, 1943, Serial No. 501,271

2 Claims. (Cl. 33—21)

This invention relates to pipe cutting apparatus and more particularly to a pipe cutting apparatus for effecting selected cuts in the wall of a pipe, and has for its principal object to provide for supporting a cutting device for circumferential movement about the periphery of a pipe while controlling longitudinal movement of said cutting device relative to said pipe.

Other objects of the invention are to provide a longitudinally reciprocable cutting device mounting on guides rotatable around a pipe to be cut; to provide for controlling longitudinal movement of said cutting device for effecting selected cuts in the pipe; to provide a guide for moving a cutting torch longitudinally of the pipe during circumferential movement of said torch about the pipe for effecting cuts in said pipe in the shape of said guide; to provide for moving a cutting torch relative to a pipe to be cut for cutting shapes such as saddles, degrees, et cetera, in the nature of fabricating pipe; to provide a templet for the desired cut around the pipe having a guide for engagement by a follower mechanism controlling movement of the torch; to provide for holding the templet in fixed relation to the pipe; to provide for ready application and adjustment of apparatus of this character to a pipe; to provide for accurately supporting the torch for planetary movement about the pipe; to provide an apparatus of this character readily adapted for mounting on various diameters of pipe and to provide a convenient, economical and efficient pipe cutting apparatus of the character and for the purpose noted.

In accomplishing these and other objects of the invention, I have provided improved details of structure, the preferred form of which is illustrated in the accompanying drawings, wherein:

Fig. 3 is a plan view of a pipe cutting apparatus, portions of the torch mounting guide being broken away to better illustrate the mechanism for controlling longitudinal movement of the torch relatively to the pipe.

Fig. 4 is an enlarged detail section through the torch mounting guide on the line 4—4, Fig. 3.

Fig. 5 is an enlarged detail section through the torch mounting guide on the line 5—5, Fig. 3.

Fig. 6 is an end elevation of the pipe cutting apparatus.

Fig. 7 is a detail perspective view of one form of templet for controlling longitudinal movement of the torch, said templet being for saddle cuts or the like.

Figure 1:
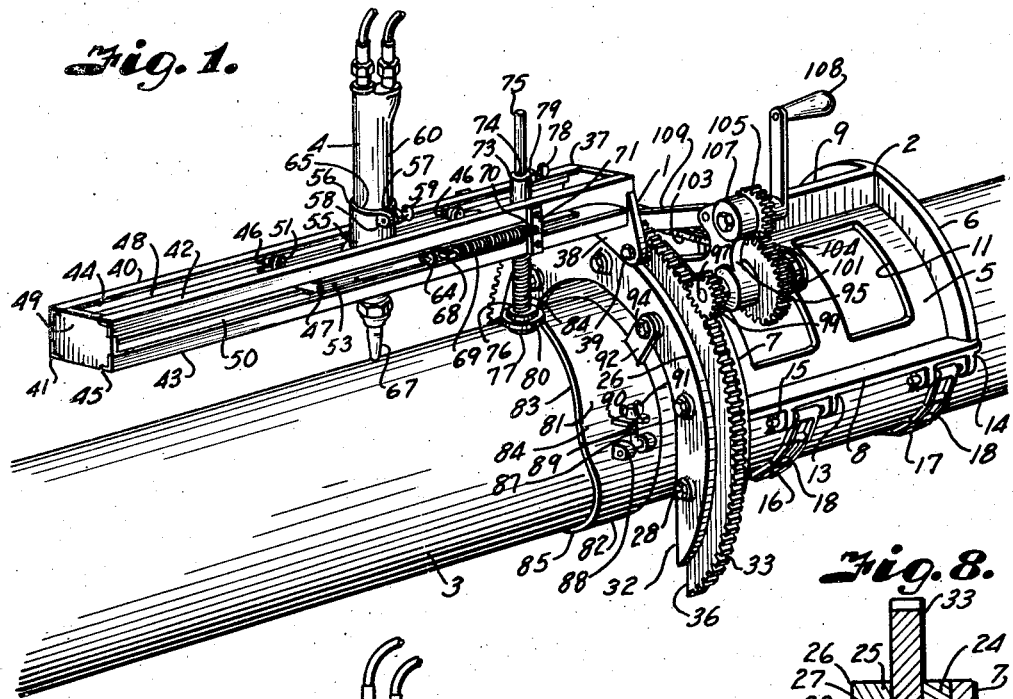
Fig. 1 is a perspective view of a pipe cutting apparatus embodying the features of the present invention.
Figures 2, 8:
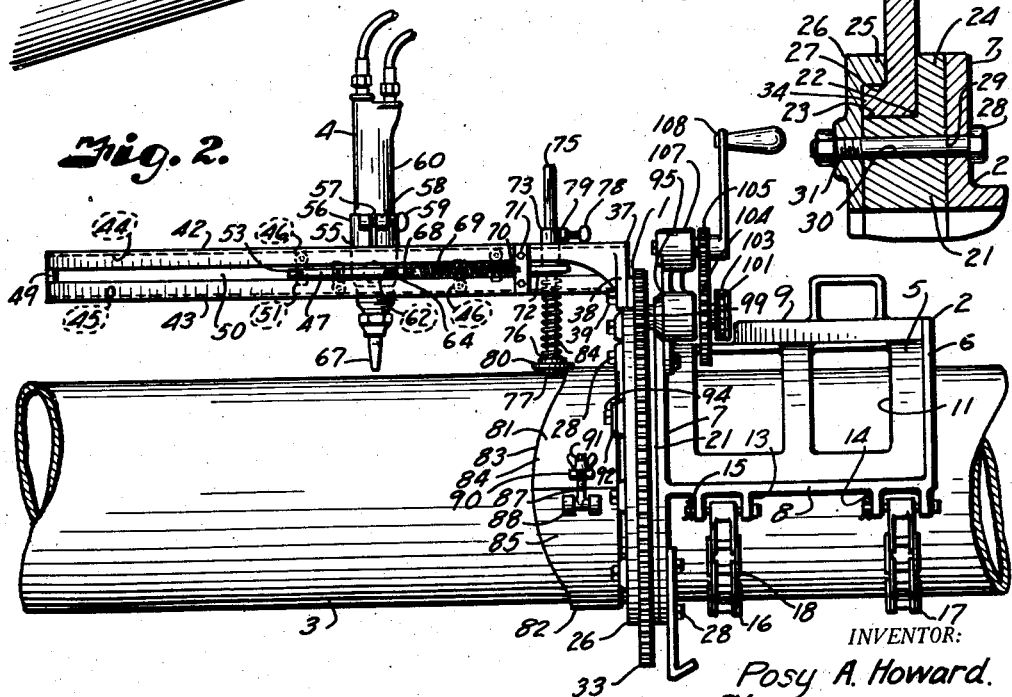
Fig. 2 is a side elevation of a pipe cutting apparatus particularly showing the engagement of the follower with the templet for controlling movement of the torch.
Fig. 8 is an enlarged detail section through the ring gear and shank members on the line 8—8, Fig. 6.

Referring more in detail to the drawings:

1 designates a pipe cutting apparatus embodying the features of the present invention and which includes a saddle member 2 adapted to engage over the upper portion of a pipe 3 for supporting a cutting torch 4 for planetary movement about said pipe. The saddle member 2 includes a semi-cylindrical body 5 having laterally extending end flanges 6 and 7 connected by longitudinal ribs 8, 9 and 10 on the respective sides of openings 11 for lightening the weight of the casting and facilitating its application to the pipe.

In order to support the saddle on the pipe, the body portion carries feet 12 for spacing the axis of the saddle concentrically with the axis of the pipe, said feet preferably being adjustable to adapt the saddle to fit various diameters of pipe.

Depending from the side ribs 8 and 10, adjacent the ends thereof, are pairs of spaced ears 13 and 14, carrying cross pins 15 for securing the ends of flexible retaining members or cinches 16 and 17, which engage under the pipes to which the saddle is applied, said retaining members preferably including chain sections 18 connected to the pins 15 at one side of the saddle and their other ends connected by means of coil springs 19 and toggle levers 20. The springs accommodate the length of the flexible members to different diameters of pipe and the toggle levers stretch the springs to retain the retaining members in engagement with the pins 15.

Fixed to the end of the end flange 7 of the saddle is a segmental ring 21, having an annular inset shoulder 22 to form an annular seat 23 and a radial flange 24 which cooperates with an inwardly extending flange 25 and a keeper ring 26 to form an annular track or groove 27 of L-shaped cross-section. The ring 21 and the keeper ring 26 are secured in concentric and axial alignment with the saddle by bolts 28 extending through openings 29 on the flange 7 and through aligning openings 30 and 31 in the respective ring members. The ends of the ring members 21 are formed on lines tangent to the inner diameter of the saddle 2 as best illustrated in Fig. 6 to form a slotted throat 32 to pass the pipe 3 when the saddle is placed thereon.

Rotatably mounted in the L-shaped groove 27 is a ring gear 33 having an inner diameter adapted to engage the seat 23 and an inwardly extending flange 34 interlocking with the flange 25 of the keeper ring 26 whereby the ring gear is retained in guided relation with the track member for rotation about the axis of the pipe, as later described.

The ends 35 and 36 of the ring gear segment are spaced apart in conformity to the width of the throat 32 as illustrated in Fig. 6, the length of the ring gear segment being such that when one end thereof is moving across the throat the other end is retained in guiding relation with the track member to assure that the opposite end is moving in alignment to re-enter the opposite end of the track member and due to the fact that the ends are always spaced apart less distance than the inner diameter of the track, the ring will be retained thereon in all positions about the periphery of the ring.

Fixed to the segmental ring gear, midway the ends thereof, is an arm 37 for mounting the cutting torch 4. The arm includes a bracket 38 secured to the ring gear by suitable fastening means such as screws 39. Mounted on the bracket 38 and extending longitudinally of the pipe on the opposite side of the ring gear 33 to the saddle 2 are pairs of vertically spaced angles 40—41 and 42—43, said pairs of angles having upper and lower inwardly directed flanges 44 and 45 which cooperate to form tracks for engagement of rollers 46 on a torch supporting carriage 47, later described. The respective pairs of angles are spaced horizontally as at 48 to provide an opening through which the torch is projected and the outer ends of the angles being preferably connected by a plate 49 to support the ends thereof and form a rigid arm for carrying the cutting torch. The vertical spacing of the angles 40, 41 and 42, 43 provide slots 50 in the sides of the arm for accommodating outwardly directed portions of the carriage 37, as later described.

The rollers 46 are preferably rotatably mounted on posts 51 extending through openings 52 in the carriage member 47 and are held in adjusted position by means of set-screws 53, a pair of the posts 51 preferably extending upwardly above the carriage 47 at each side thereof and a pair preferably extending below the carriage at each side thereof to provide two rollers 46 on each side of the carriage engaging the lower flanges 45 of the arm and two rollers engaging the upper flanges 44 on each side of the carriage, whereby said carriage may be supported for free rolling movement throughout the length of the arm but held against vertical or lateral movement relative thereto.

Arranged in the carriage 47 and centrally located relative to the laterally spaced angles of the arms is an opening 54 adapted to receive a torch supporting member 55, preferably including an upwardly extending collar 56 slotted as at 57 and provided with bosses 58 to receive an adjusting screw 59 for tightening the collar 56 about the barrel 60 on the torch. The torch supporting member 55 is preferably provided with trunnions 61 and 62 adapted to be mounted in bearings 63 on the carriage whereby the cutting torch is supported for angular adjustment relative to a transverse plane through the pipe to permit a beveled edge to be formed on the cut edge of the pipe, said torch supporting member being held in angular adjusted position by means of a set-screw 64. The torch carrying member 55 is preferably provided with a bore 65 substantially of the same shape as the cutting torch barrel, the lower end of the bore 65 being curved, as at 66, to provide a seat for said cutting torch and permit the nozzle end 67 of said torch to be projected through the bore and in close proximity to the pipe to be cut.

Projecting outwardly from the side of the carriage 47 and through the openings 50 are ears 68 adapted to receive one end of springs 69, having their opposite ends attached to lugs 70 on bars 71 secured to the sides of the pairs of vertically spaced angles forming the arm 37 whereby spring tension is applied to the carriage 47 to draw same toward the gear. The end of the carriage 47 adjacent the ring gear is preferably provided with an extension 72 on which is mounted an upwardly extending collar 73 having a bore 74 therethrough for slidably receiving a shank 75 of a follower 76, the lower end of said follower being provided with a roller 77 adapted to be in substantial engagement with the pipe to be cut and held in such position by means of a set-screw 78 threaded into a boss 79 on the collar 73. The roller 77 preferably is provided with a flange 80 adapted to ride on the outer surface 81 of a templet 82 having a guide edge 83 adapted to be engaged by the roller 77 to move the torch longitudinally of the pipe as it is moved circumferentially thereof to provide a cut in said pipe corresponding to the shape of the templet. A spring 84 preferably is provided around the shank 75 of the follower having one end engaged with the roller and the other end with the carriage 47 to normally hold the roller in engagement with the templet 82.

The templet is preferably formed of two semicircular sections 84 and 85 hinged together, as at 86, whereby the sections may be hinged apart to permit application of said templet around the pipe 3, the open ends of the respective portions of the templet being held together by means of a screw 87 swivelly mounted in bosses 88, preferably on the lower portion 85 of the templet, said screw being adapted to project through a slotted opening 89 in an ear 90 on the upper portion 84 of the templet and adapted to receive a wing-nut 91 for drawing the open ends of the templet together and holding same.

In order to support the templet from the saddle 2 and hold said templet against rotation relative to the pipe, the upper portion 84 is preferably provided with an outwardly extending ear 92 having an aperture 93 therein, through which a bolt 94 may be extended to secure said templet to the rings 26 and 27 and saddle 2, said bolt 94 passing through the respective plates in the same manner as the bolts 28.

The arm 37 is arranged at right angles to the ring gear segments and the follower roller 77 held in engagement with the templet face 81 by means of the spring 69 so that when the ring gear segment is rotated about the track, the pipe is cut by the flame from the nozzle of the cutting torch as it is revolved around the pipe and simultaneously moved longitudinally thereof in accordance with the curvature of the guiding edge 83 of the templet.

In order to rotate the ring gear segment, the flange 7 is provided with radial brackets 95 and 96 spaced apart a greater distance than the spacing between the ends of the ring gear and rotatably mounted therein are shafts 97 and 98 carrying pinions 99—100 meshing with the ring gear, and sprockets 101 and 102 that are operatively connected by a chain belt 103. One of the shafts is provided with a gear 104 which is driven by a pinion gear 105 fixed on a shaft 106 rotatably mounted in a bracket extension 107, the shaft 106 being manually rotated by means of a crank or the like 108. It is apparent that when the crank 108 is rotated the gear 105 drives the gear 104 to effect rotation of the pinion 99 and the pinion 100 through the sprocket and chain connection. Rotation of the pinion gears drives the ring gear to carry the cutting torch about the periphery of the pipe to effect a cut having an edge depending upon the angular adjustment of the cutting torch. Owing to the fact that the ring gear is guidingly supported by the track throughout its entire movement and the track is securely anchored to the pipe, the cut in the pipe formed by the cutting torch will be in a plane at right angles to the axis of the pipe except where the templet guiding edge 83 is so shaped to move said cutting torch and carriage therefor longitudinally of the pipe to make a selected cut therein so that the cut end of the pipe can be abutted against other pipe sections having suitable openings therein to receive the pipe section on which the selected shape is cut.

The radial brackets 95 and 96 are preferably braced by a link 109 secured to ears thereon to provide a sturdy mounting for the gear rotating mechanism.

In using a cutting apparatus constructed and assembled as described, the nut 91 is loosened on the screw 87 whereby said screw may be hinged outwardly away from the ear 90 to permit hinging of the lower portion of the templet away from the upper portion thereof which is secured to the saddle 2 and segmental plates 26 and 21. The retaining members 16 and 17 are then released from the saddle to permit the saddle and templet to be applied to the upper portion of a pipe and clamped thereon adjacent the point at which the cut is to be made, the spacing feet having been adjusted to concentrically align the axis of the saddle with that of the pipe so that the ring gear 33 will be rotated about the axis of the pipe when the cut is being made. After the saddle has been adjusted to the size of the pipe it is not again necessary to adjust the spacing feet unless it is desired to cut a pipe of different diameter, however, the templet must be changed according to the particular type of cut, i. e., saddles, bevels, et cetera, that is desired to be made in the pipe. When the saddle is applied to the pipe, the opening between the ends of the ring gear will have to be aligned with the throat of the track to permit mounting of the saddle on the pipe, but when the ring gear is rotated the ends thereof will move in guided relation across the throat of the track and be retained by the track for rotation about the pipe.

The angularity of the cutting torch is adjusted in the carriage 47 so the nozzle 57 of said cutting torch is directed to the proper angle to make the desired bevel on the cut. The tension of the springs 69 holds the follower roller 77 in engagement with the guiding edge 83 of the templet whereby rotation of the crank 108 effects a gradual planetation of the arm 37 about the pipe. The guiding edge 83 of the templet effects longitudinal movement of the carriage 47 on the rollers 46 in the track formed by the angles of the arm 37. The flame from the cutting torches burns through the wall of the pipe so that when said torch has made one complete revolution about the pipe the proper cut has been made thereon. After the cut has been made the ring gear is moved so that the ends thereof align with the sides of the throat in the track. The nut 91 is loosened to permit hinging of the lower portion of the templet away from the pipe and the toggle levers 39 are released to permit removal of the retaining members 16 and 17 from engagement with the saddle whereby the saddle carrying the ring gear, torches and templet is lifted from the pipe completing the operation.

From the foregoing it is apparent that I have provided a cutting apparatus which may be readily attached to a pipe without disassembling the ring gear or any part of the apparatus, and that due to the positive mounting of the templet and the reciprocal mounting of the torch, the cuts that are produced in the pipes are smooth and regular and of the selected shapes for fitting the end of the pipe to other pipes as in pipe fabrication.

What I claim and desire to secure by Letters Patent is:

1. In a pipe cutting apparatus, segmental ring and track members having ends spaced apart to pass the members over a pipe to be cut, a saddle supporting the track member, means on the saddle having engagement with the pipe for positioning the axis of the track member concentric with the axis of the pipe, clamping means for securing the saddle to the pipe, a pair of driving members supported in fixed relation to the saddle and having driving contact with the segmental ring for moving the ring member on the track member, means on the ring member for mounting an instrument for movement longitudinally of the pipe, a templet about the pipe adapted to fit against one side of said segmental track and provided with a guiding edge, a templet follower operatively engaged with the instrument and movable toward the pipe, a flange on the follower for engagement with the templet for limiting movement of said follower toward the pipe, and means for resiliently urging said templet follower to engage with the templet for controlling the cut of the pipe in accordance with the shape of the templet.

2. In a pipe cutting apparatus, a ring-like driven member, means for supporting the driven member for rotation coaxially of a pipe, means fixed to the driven member for moving an instrument over the pipe, driving means for the driven member for rotating the driven member about the axis of the pipe to effect planetation of the instrument moving means, a carrier slidable on the instrument moving means longitudinally of the axis of the pipe, a templet carried by the driven member supporting means and having a guiding edge encircling the pipe coaxially therewith, a roller movably mounted on the carrier for engaging the guiding edge of the templet, resilient means urging the roller toward the pipe, a flange on the roller for engaging the templet for limiting the movement of the roller toward the pipe, and a spring connected with the carrier for urging the carrier in a direction to retain said roller in guided engagement with said guiding edge during planetation of the instrument moving means.

POSY A. HOWARD.